March 30, 1954     H. SKODOCK     2,673,502
STAND FOR CAMERAS
Filed May 15, 1951     2 Sheets-Sheet 2
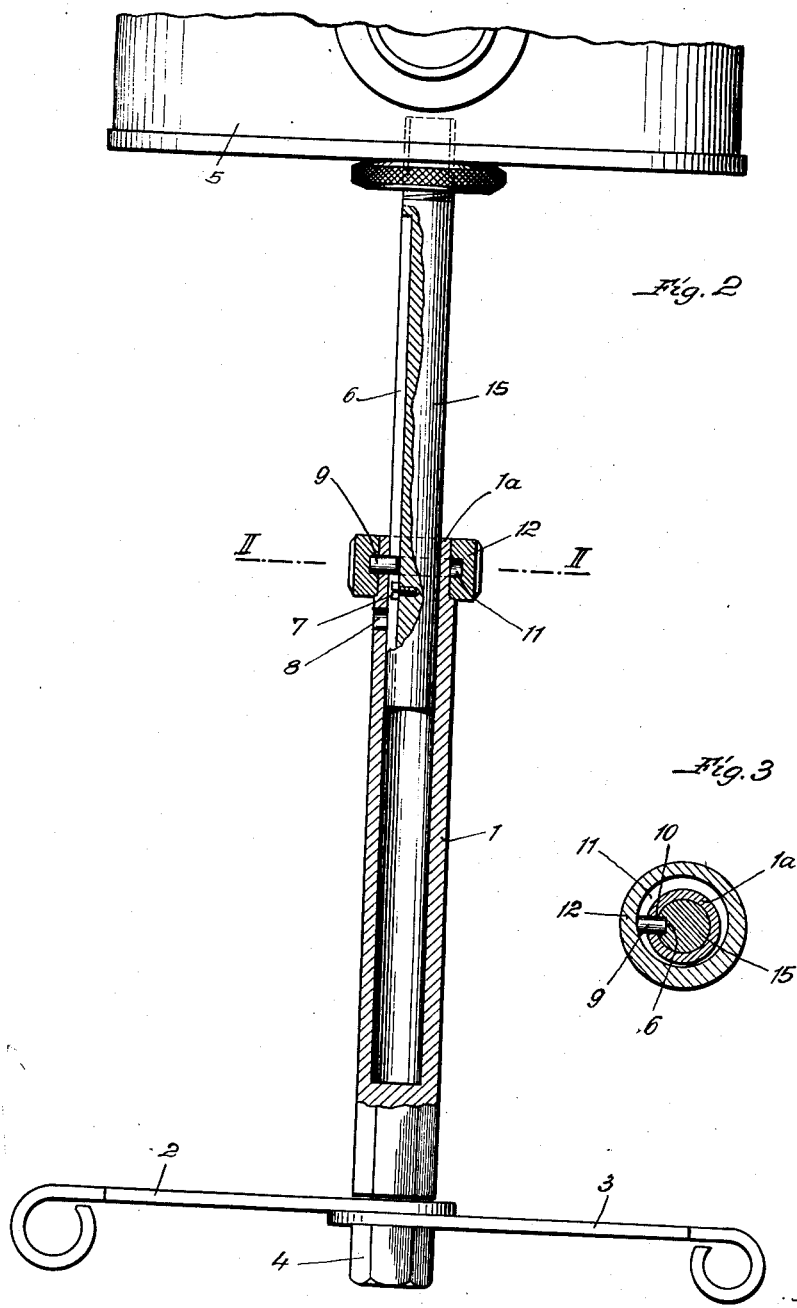
INVENTOR:
Hans Skodok
by Armand E. Mertion
Attorney Patented Mar. 30, 1954

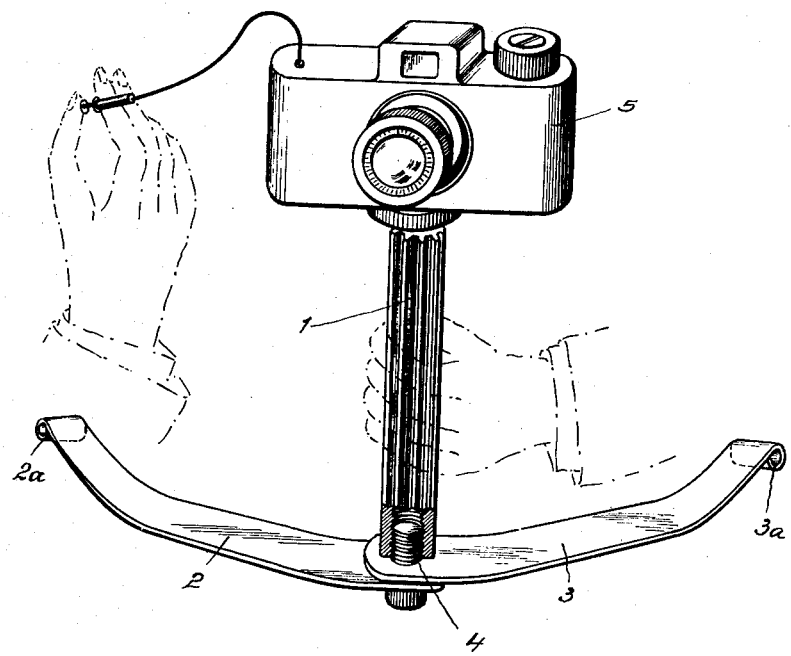

2,673,502

UNITED STATES PATENT OFFICE 2,673,502

STAND FOR CAMERAS

Hans Skodock, Hannover-Herrenhausen, Germany

Application May 15, 1951, Serial No. 226,389

3 Claims. (Cl. 95—86)

When taking photos without any stable support, it often happens that, in case of a relatively long time of exposure (1/25, 1/10, 1/5 of a second), the photographer moves his camera. This may also occur when the camera is only supported by the chest of the photographer, a strap laid round the latter's neck being an additional hold. In such cases, frequently, neither the strap nor the support on the chest can prevent the camera from being laterally moved.

This kind of moving the camera is, with a great degree of reliability, prevented by the device according to the present invention. The invention in question consists in a support being formed by a stand which is vertically arranged, and by two horizontal arms, which are fixed on the lower end of the stand, both forming a bow-shaped device. This new support will be held round the vertical stand in such a way that the ends of the two horizontal arms can be pressed against the photographer's chest. The camera is fixed on the top end of the vertical stand, being pressed against the photographer's forehead. Thus, the necessary three-dimensional propping of the camera is obtained.

The two above mentioned horizontal arms can be made of a single piece. A two-piece arrangement is, however, more useful, with the arm being swivel-mounted round the longitudinal axis of the vertical stand. In this way, a good adjustment to the body of the photographer is rendered possible. Moreover, the support can be folded up, thus being less cumbersome.

If the horizontal arms are removably attached to the vertical stand, the support can be taken apart and the single parts can be packed in a small case. It answers the purpose best if the horizontal arms are made of sheet metal strips rolled up at the extreme ends. The use of the new support will then not turn out to be burdensome. Moreover, any damage of the clothing will be prevented.

The support can be adjusted for persons of any height. For this purpose, the stand of the whole support, which is vertically to be arranged, consists of two telescopic parts; the latter can be locked in the required position.

According to one embodiment of the invention, the above mentioned adjustment can easily be made by clamping a pin, which slides in a radial bore of the outer part of the stand, to the inner part having an axial groove, by means of a curved surface formed by an eccentric groove of a ring mounted on the outer part of the stand. The ring is rotatable by hand.

According to another embodiment of the invention, the telescopic movement of the parts of the stand is limited by an element which is arranged in the axial groove, the element in question being arrested by the pin in the extreme position of the respective part of the stand.

The accompanying drawings illustrate an example of the device according to the invention explaining at the same time the manner of operation:

Fig. 1 shows the support in perspective;

Fig. 2 shows a longitudinal central section of the support, and

Fig. 3 a cross-section along the line II—II of Fig. 2.

The support consists of the vertical stand 1 and the horizontal arms 2, 3. Both horizontal arms are shaped and connected to form a bow.

The arms are pivotally mounted on the vertical stand 1, around a screw-thread 4 which is provided with a locking nut. Their extreme ends 2a, 3a, which are to be pressed against the photographer's chest, are rolled up. The camera 5 is fixed on the upper end of the stand 1, and is pressed against the photographer's forehead at the moment he is taking a photo.

As shown in Fig. 2 and Fig. 3, the vertical stand consists of telescopic parts 1 and 15. The telescopic part 15 contains an axial groove 6. The limitation of the telescopic movement is ensured by a cap screw 7 screwed in part 15 of the stand. A bore 8 provided in the exterior part 1 of the stand permits the fitting of these parts.

The upper end of part 1 of the stand is formed by a ring-shaped part 1a. Ring 12, which is rotatable by hand, is fitted on that part.

Ring 12 is provided with an eccentric groove 11. The latter is needed for the radial adjustment of a pin 9 sliding in a radial bore 10 of the ring-shaped part 1a. By the clockwise turning of ring 12, the pin 9 is pressed against the bottom of the axial groove 6 of the interior part 15 of the stand. Thereby, the parts 1 and 15 are pressed against each other.

Moreover, it is the function of pin 9 to prevent any axial shifting of ring 12 on part 1a of the stand.

The kind of material to be used for this new support is only of a secondary importance to the idea of the invention. A suitable material, for instance, would be light metal. The vertical stand need not be rigid; it can consist of a metal hose which has a certain resistance to binding.

I claim:

1. A support for a photo camera comprising a longitudinally extending standard having an upper and a lower end, said upper end being adapted to carry a camera which is to be pressed against the head of an operator, and two arcuate arms connected to said standard adjacent to said lower end of said standard and mounted thereon for pivotal rotation in a plane substantially perpendicular to said standard, whereby upon pivotal displacement of said arms about said standard both said arms assume a bow-shaped contour, the ends of said arms when pressed against the chest of the operator together with the camera pressed against the head of said operator constituting a stable three-point support.

2. A support according to claim 1, wherein said standard consists of an outer and an inner part, arranged to telescope with respect to each other, said outer telescopic part having a radial bore and said inner telescopic part an axial groove, a pin slidably fitted in said radial bore and capable of engaging with its free end with said groove, and wherein a clamping ring, rotatable by hand, is provided on said standard capable of locking said parts in a desired position, said locking ring being fitted on said outer telescopic part, and having an eccentric groove on its inner surface capable of engaging the outer end of said pin.

3. A support according to claim 2, wherein an element is provided for limiting the telescopic movement of said inner and outer parts of the standard, said element being arranged on said axial groove of said inner part and capable of being arrested by said pin in the extreme position of said telescoping parts.

HANS SKODOCK.

References Cited in the file of this patent

UNITED STATES PATENTS

| Number | Name | Date |
|---|---|---|
| 1,018,771 | Neuburger | Feb. 27, 1921 |
| 1,993,485 | Paul | Mar. 5, 1935 |
| 2,270,931 | Corcoran | Jan. 27, 1942 |
| 2,370,611 | Du Mais | Feb. 27, 1945 |